Patented Jan. 26, 1932

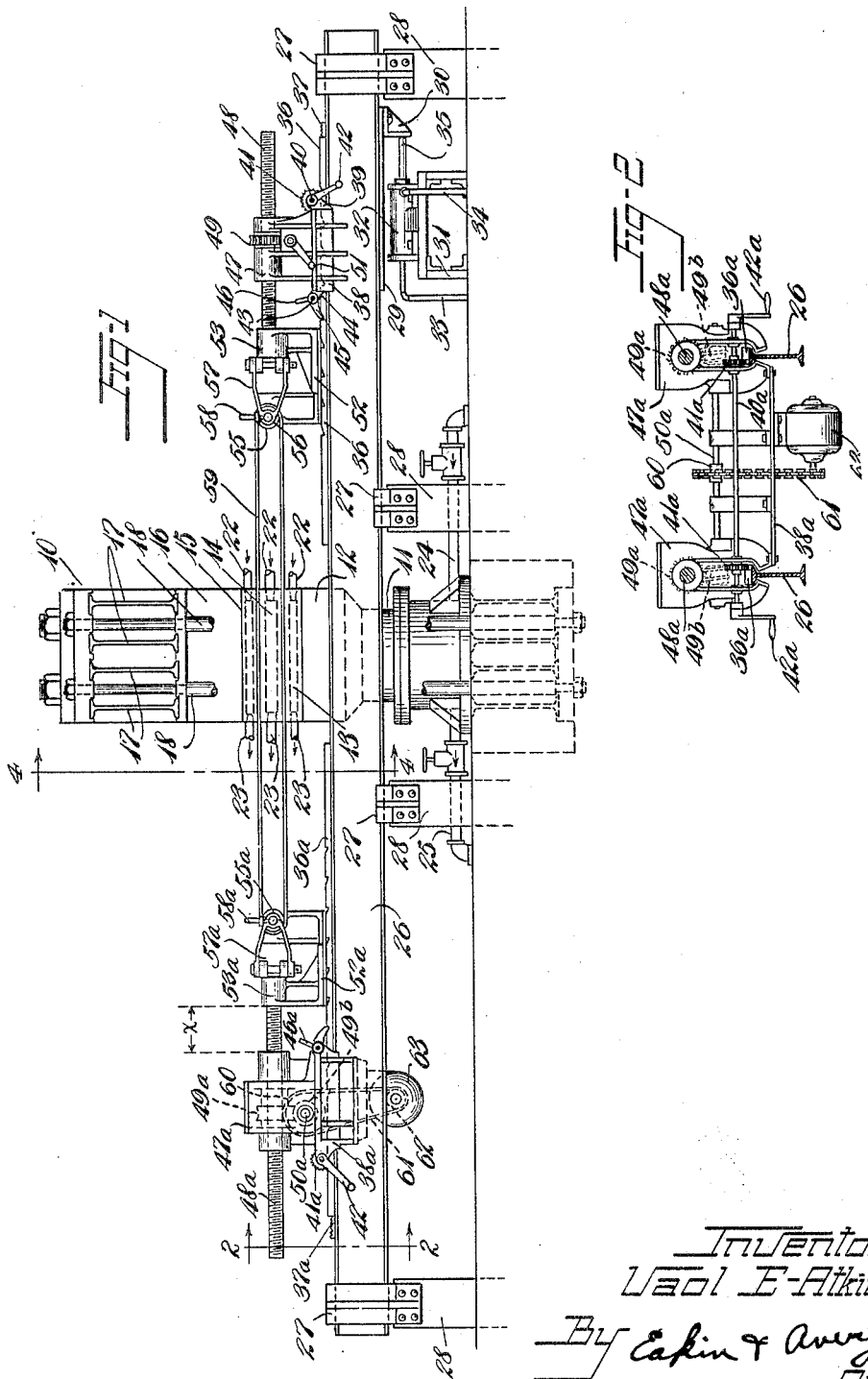

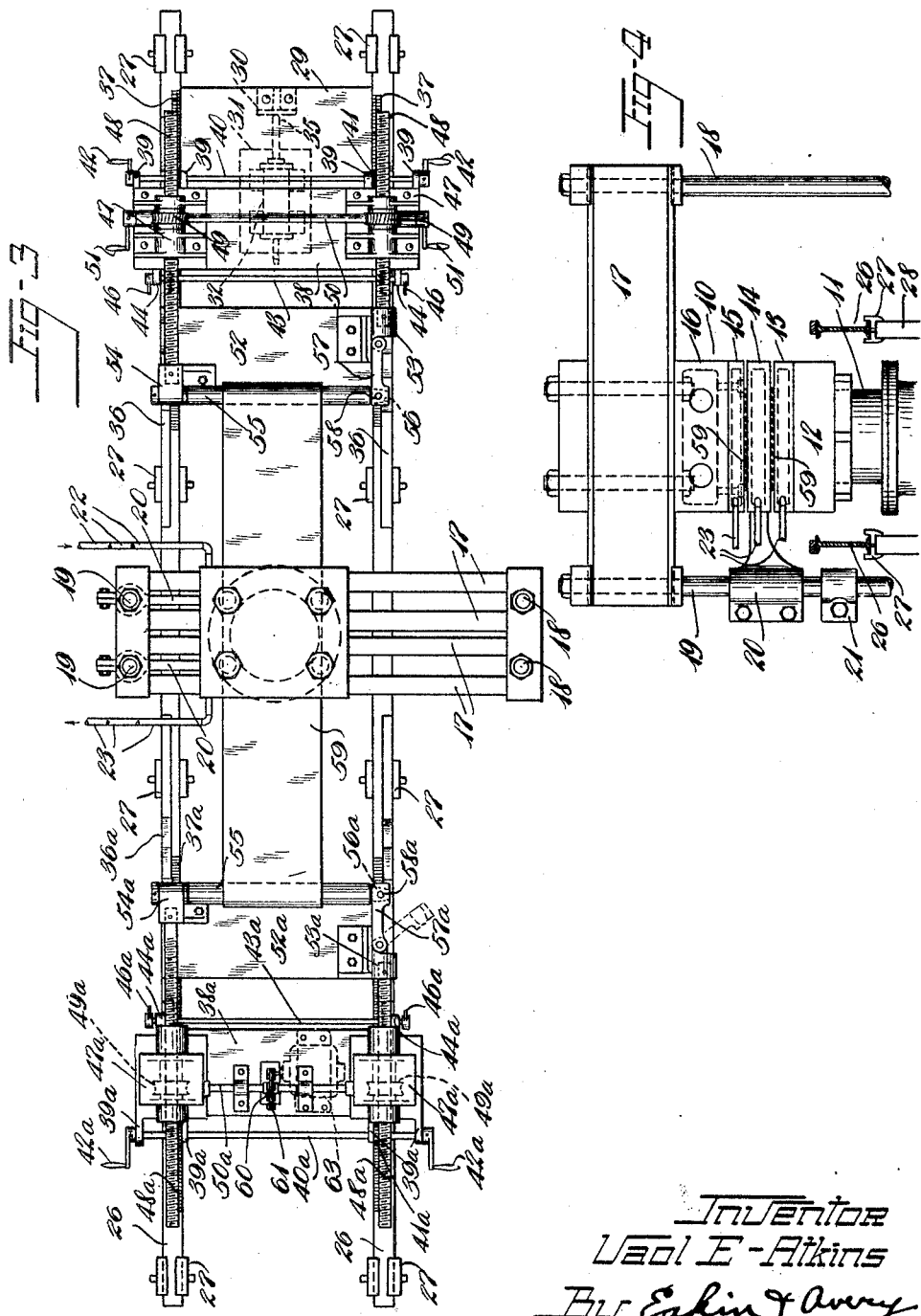

1,842,646

UNITED STATES PATENT OFFICE

VAOL E. ATKINS, OF AKRON, OHIO, ASSIGNOR TO THE B. F. GOODRICH COMPANY, OF NEW YORK, N. Y., A CORPORATION OF NEW YORK

VULCANIZING APPARATUS

Application filed May 5, 1930. Serial No. 449,742.

This invention relates to vulcanizing apparatus, and more especially it relates to apparatus for vulcanizing articles under tension, such as conveyor or transmission belts of fabric and rubber, wherein the articles are of such length as to require the successive vulcanization of adjacent zones lengthwise of the belt.

In the vulcanization of belts of the character mentioned, with the apparatus heretofore provided, considerable difficulty is encountered in obtaining uniformity of tension in the respective zones of the belt, due to the fact that during vulcanization the tension on the unconfined portions of the belt is released, and thereafter the tensioning means is required to be returned exactly to its original position to impart the same tension to the succeeding zone of the belt. With no interconnection between the tensioning members, which engage the respective ends of the belt, such re-positioning is laborious and frequently inaccurate.

The chief objects of this invention are to assure uniformity of structure and stretch in endless belts; to save time and labor in the vulcanization of belts; and to provide apparatus for accomplishing the foregoing objects. More specifically I aim to provide tension mechanism on opposite sides of the vulcanizing press, adapted to release tension on the belt on both sides of the press by movement of but one tensioning member with relation to the other tensioning member, and so constructed and arranged as to tension all parts of the belt equally.

Of the accompanying drawings:

Fig. 1 is a side elevation of apparatus embodying my invention in its preferred form, and the work therein, a part being broken away.

Fig. 2 is a section on line 2—2 of Fig. 1.

Fig. 3 is a plan view of the apparatus shown in Fig. 1.

Fig. 4 is a section on line 4—4 of Fig. 1.

Referring to the drawings, 10 is a vulcanizing press comprising a hydraulic ram 11 provided with a ram-head 12, a lower platen 13 mounted upon said ram-head, a middle platen 14, and an upper platen 15. The latter is secured to an upper-press-head 16 which is supported by a plurality of I-beams 17, 17 mounted upon the upper ends of a plurality of upright cylindrical posts 18, 19, positioned in pairs at the front and rear of the press respectively. The middle platen 14 is supported solely by the posts 19 upon brackets 20, 20 slidably mounted thereon, and collars, such as the collar 21 (Fig. 4) are secured to the respective posts 19 below the brackets 20 to limit the downward movement of the latter when the press is opened. The posts 18 are positioned a sufficient distance in front of the platens to permit the work to be inserted edgewise between the platens, whereby endless belts may be vulcanized in the press. Respective inlet pipes 22 and outlet pipes 23 are provided for supplying steam to the platens to heat the same in the usual manner, and inlet and outlet pipes 24, 25 respectively are provided for supplying pressure fluid to raise the hydraulic ram 11.

Positioned at the front and rear of the press 10, between the posts 18 and 19, and extending each side of the press a substantial distance, are respective parallel rails 26, 26 which are slidably mounted in spaced apart guides 27, 27 mounted upon respective supports or piers 28, 28. At one end (the right as shown in Figs. 1 and 3) the rails 26 are joined together by a plate 29 secured to their bottom flanges, and a downwardly extending bracket 30 is mounted upon the under side of the plate 29. Mounted upon a stationary support 31 between the press 10 and the bracket 30 is a double acting fluid pressure cylinder 32 having fluid inlet and outlet pipes 33, 34 communicating with its respective ends, the arrangement being such that one end of the cylinder is discharged as the other end is charged. The cylinder 32 is provided with the usual piston rod 35 which is adapted to engage the bracket 30 but is not connected thereto. When the piston rod 35 is fully projected it is in engagement with the bracket 30 and it thus provides means for determinately positioning the rails 26 with relation to the press 10.

Mounted upon the top faces of the respective rails 26, to the right of the press 10 as viewed in Figs. 1 and 3, and at the outer edges of said rails, are notched plates 36, 36, and beside said plates, at the inner edges of the rails, are racks 37, 37. The tops of the teeth of the racks 37 are below the tops of the notched plates 36, and the notches of the latter are spaced sufficiently far apart so that the plates 36 provide a suitable support for a carriage 38 which is slidably mounted thereon. Journaled in suitable bearing brackets 39, 39, formed on the side of the carriage 38 remote from the press 10, is a shaft 40 provided with gear pinions 41, 41 meshed with the respective racks 37, and the respective ends of the shaft 40 are provided with cranks 42 by which the shaft may be turned from either side of the apparatus to move the carriage longitudinally of the rails 26. On the opposite side of the carriage 38 from the shaft 40 is a rock-shaft 43 which is suitably journaled in bearing brackets 44, 44 formed on the carriage, and said rock-shaft is provided with pawls 45, 45 adapted to engage the notches of the respective notched plates 36. The respective ends of the rock-shaft 43 are provided with handles 46, 46 by which the shaft is manually rocked to lift the pawls 45 from the notches of the plates 36, and said notches are so disposed that the pawls 45 engage the same when the carriage 38 is moved toward the press, but slide over the notches when the carriage is moved away from the press.

The carriage 38 comprises a pair of upstanding bearing brackets 47, 47 positioned substantially over the rails 26, and each of said brackets is formed, parallel to said rails, with a bore in which is mounted a threaded shaft or screw 48, said screws being adapted for axial sliding movement in said bores. Positioned in suitable slots in the respective brackets 47, and threaded onto the screws 48, are nuts 49, 49 which are annular in form and have their peripheries formed as worm gears which are meshed with worms (not shown) mounted upon the respective end portions of a shaft 50 journaled in the brackets 47, and each end of said shaft is provided with a crank 51 by which the shaft 50 is turned from the front or rear of the apparatus. The arrangement is such that rotation of the shaft 50 feeds the screws 48 axially of the brackets 47.

Slidably mounted upon the notched plates 36 between the press 10 and carriage 38 is a slide or cross-head 52, and mounted thereon are upstanding brackets 53, 54 at the near and far side of the apparatus respectively, said brackets being secured respectively to the adjacent end of one of the screws 48. Journaled at one end in the bracket 54, and extending therefrom to the front of the apparatus, is a pulley or roll 55, and the opposite end of said pulley is formed with a slightly tapered journal 56 adapted to fit within a complementally shaped socket formed in a latch or gate 57, for supporting the free end of said pulley. The gate 57 is hinged to the bracket 53, and its free end is provided with a spring-pressed detent 58 which extends into the socket in the gate and seats in a circumferential groove in the journal 56 to maintain the gate and journal in operative relation, yet permitting the gate readily to be opened for mounting the work, such as the endless belt 59, upon the pulley 55.

At the left hand side of the apparatus as viewed in Figs. 1 and 3, the rails 26 support mechanism which is so nearly identical to the mechanism at the right side of the press that a detail description thereof is deemed unnecessary, and the identical parts thereof are given the same reference characters as are used on the right hand side of the figures, and the exponent "a". In the mechanism at the left hand side of the apparatus, the cranks at the ends of the shaft 50$^a$ are omitted, and a sprocket 60 is mounted upon said shaft and connected by a sprocket chain 61 with a sprocket 62 on a motor 63, the latter being mounted upon the under side of the carriage 38$^a$. The worms on the shaft 50$^a$ which mesh with the nuts 49$^a$ (not shown in the mechanism at the right of the figures) are shown at 49$^b$, 49$^b$, Fig. 2.

In the operation of the apparatus, the initial step of mounting the endless unvulcanized belt 59 is effected while the press is open and its platens separated, the gates 57, 57$^a$ are open to permit the belt to be mounted upon the pulleys 55, 55$^a$, the rear end of the cylinder 32 is charged to position the rails 26 in the position shown, the carriage 38 and cross-head 52 are in the positions shown, the carriage 38$^a$ is in the position shown, but the cross-head 52$^a$ is closer to the press than is shown in the drawings to permit the work easily to be mounted upon the pulleys. After the work is mounted upon the pulleys 55, 55$^a$ the gates 57, 57$^a$ are closed, and the motor 63 set in motion to rotate the shaft 50$^a$, worms 49$^b$, and nuts 49$^a$ whereby the shafts 48$^a$ are fed rearwardly to draw the cross-head 52$^a$ away from the press to tighten and tension the belt 59. The press is then closed upon the regions of the belt between the press-platens and vulcanization thereof effected.

It is not desired to maintain tension on those portions of the belt not between the platens. In preparation for relieving such tension, pressure fluid is admitted to the front end of the cylinder 32, as its rear end is vented, to retract the piston rod 35 of the cylinder. The motor 63 is then reversed, to cause the cross-head 52$^a$ to move toward the press and thus slacken the portions of the belt on the respective sides of the press, the rails 26 and all the mechanism thereon freely moving to the left as shown in the drawings. This movement of the rails 26 is relatively small and is not sufficient to absorb the slack in the work between the press and the pulley 55ª.

After vulcanization is effected the press is opened, the rear end of the cylinder 32 is charged to move the rails 26 toward the right to a determinate position with relation to the press, and the belt 59 is moved lengthwise around the pulleys 55, 55ª to bring adjacent unvulcanized regions thereof between the platents of the press. The operations described are then repeated.

The notched plates 36, 36ª and pawls 45, 45ª are used only for major adjustments of the respective carriages 38, 38ª with relation to the press 10 to adapt the apparatus for vulcanizing belts of a large range of sizes. adjustment of the cross-head 52 with relation to the carriage 38 permits major adjustments to be made with accuracy.

It will be observed that neither the carriages 38, 38ª or the cross-head 52 move relatively of the rails 26 during the normal operation of the apparatus, and that the rails are returned to a determinate position with relation to the press prior to the tensioning of the work as the initial step during operation. This facilitates the tensioning of the work since uniformity of tension is obtained in the belt, as successive regions thereof are positioned in the press, simply by moving the cross-head 52ª to a determinate position at each tensioning operation. This position is usually determined by measuring the distance between the carriage 38ª and cross-head 52ª at the point X as shown in Fig. 1.

Those parts of the apparatus which require to be moved during the normal vulcanizing operations are power driven, and quick and accurate positioning of the movable parts is easily accomplished and uniformity of stretch in the finished product is obtained.

The invention may be modified within the scope of the appended claims as I do not limit the claims wholly to the specific structure shown and described.

I claim:

1. Vulcanizing apparatus comprising a press, work tensioning means comprising respective work-engaging members at opposite sides of the press, and means for concurrently moving both work-engaging members with relation to the press while maintaining their established relation to each other.

2. Vulcanizing apparatus comprising a press, work tensioning means comprising respective work-engaging members at opposite sides of the press, and a common support for said work-engaging members, said support being movable with relation to the press.

3. Vulcanizing apparatus comprising a press, work tensioning means comprising respective work-engaging members at opposite sides of the press, a common support for said work-engaging members movable with relation to the press, and means for determinately positioning said support with relation to the press.

4. Vulcanizing apparatus comprising a press, respective members at opposite sides thereof adapted to engage work positioned in the press, and a common support for said work-engaging members, at least one of which is movable with relation to said support, said support being movable with relation to the press.

5. Vulcanizing apparatus comprising a press, respective members at opposite sides thereof adapted to engage work positioned in the press, a common support for said work-engaging members, said support being movable with relation to the press, and means for moving one of the work-engaging members with relation to said support.

6. Vulcanizing apparatus as defined in claim 5 including means for moving the support for the work-engaging members to a determinate position with relation to the press.

7. Vulcanizing apparatus comprising a press, respective work-tensioning mechanisms at opposite sides thereof, a common support for said work-tensioning mechanisms, said support being movable with relation to the press, means for adjusting the positions of the work-tensioning mechanisms upon said support, and means for moving a work-engaging portion of at least one of said mechanisms with relation to said support without altering the position of the mechanism as a whole.

In witness whereof I have hereunto set my hand this 29th day of April, 1930.

VAOL E. ATKINS.